United States Patent Office 2,745,720
Patented May 15, 1956

2,745,720

ACID-BASE INDICATOR DYESTUFFS

Gerold Schwarzenbach, Zurich, and Richard Sallmann, Basel, Switzerland, assignors to Ciba Limited, Basel, Switzerland, a Swiss firm No Drawing. Application August 25, 1952,
Serial No. 306,284

Claims priority, application Switzerland August 29, 1951

12 Claims. (Cl. 23—230)

According to this invention valuable new derivatives of acid-base indicator dyestuffs, which contain a hydrogen atom at least in one position vicinal to an auxochromic group, are made by replacing the hydrogen atom in at least one such vicinal position by the radical

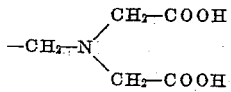

The expression "auxochromic groups" is to be understood to include amino groups bound to an aromatic nucleus and hydroxyl groups of phenolic characters. Especially valuable derivatives are obtained when the auxochromic group is such a hydroxyl group.

For the synthesis of the derivatives of the invention, which are derived from indicator dyestuffs having a hydroxyl group of phenolic characters as the auxochromic group, the indicator dyestuff may, for example, be reacted with formaldehyde or a compound yielding formaldehyde and with an iminodiacetic acid or a salt or functional derivative of such acid. The condensation is advantageously conducted in the presence of an aqueous solution of an alkali hydroxide, if desired, with the addition of a water-soluble organic solvent, such as methyl alcohol, ethyl alcohol, acetone or dioxane. The reaction is carried out at room temperature or a raised temperature, for example, 50–70° C. The formaldehyde may be used in the form of para-formaldehyde, advantageously it is used in the form of a concentrated aqueous solution. When, instead of the free iminodiacetic acid, a functional derivative thereof is used for the condensation such as the nitrile or an ester, the reaction is followed by a hydrolysis to produce the free acid.

Instead of causing the three components to react together at the same time, a methylol-compound may first be formed from the indicator dyestuff and formaldehyde, and the methylol compound can then be condensed with the imino diacetic acid in aqueous alkaline solution. Alternatively, the methylol compound may be reacted with a derivative, for example, an ester, of the iminodiacetic acid in the presence of an acid, for example, acetic acid, and then the resulting ester is saponified.

Finally, the indicator dyestuff may first be converted into a halogen-methyl compound, for example, a chloromethyl compound. The reaction of the resulting halogenmethyl compound with the iminodiacetic acid or a salt or functional derivative thereof is then advantageously carried out by heating the components, advantageously with the addition of an organic solvent, such as benzene, toluene, xylene, low boiling benzine, ethyl acetate, alcohol, butanol, etc. It is of advantage to use two molecular proportions of the iminodiacetic acid for each halogen methyl group, one molecular proportion serving to bind the hydrohalic acid formed.

The number of radicals of the formula

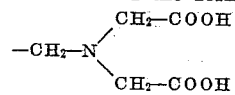

which can be introduced into the indicator dyestuff in accordance with the present process depends firstly on the constitution of the dyestuff, that is to say, on the number of hydroxyl groups of phenolic character which it contains and of the free positions vicinal thereto, and secondly on the relative proportions in which the reaction components are used.

The derivatives of the invention, which are derived from indicator dyestuffs containing a hydroxyl group as an auxochromic group, contain at least once the following atomic grouping

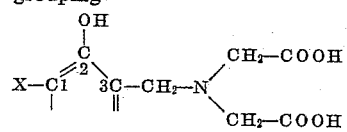

in which X represents hydrogen or any desired organic radical or the grouping

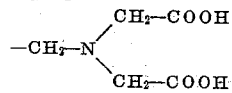

and in which the carbon atoms marked 1, 2 and 3 belong to an aromatic ring system, advantageously a 6-membered ring.

The indicator dyestuffs which are converted into derivatives in accordance with the present invention, may belong to a very wide variety of classes of compounds. There may be mentioned indicator azo-dyestuffs such, for example, as 2:4-dihydroxy-4'-nitro-1:1'-azobenzene, 2:4 - dihydroxy - 1:1' - azobenzene - 4' - sulfonic acid, 4 - hydroxy - 3' - or - 4' - nitro - 1:1' - azobenzene - 3' - carboxylic acid or salts thereof. Furthermore there may be mentioned nitro phenols, such as ortho-, meta- or para-nitrophenol, 2:4- or 2:5-dinitrophenol or 4-nitro-ortho-cresol. Especially valuable are dyestuffs of the triphenylmethane series such as phthaleins and sulfophthaleins. As examples there may be mentioned dichlorophenol-sulfophthalein, dibromophenol-sulfophthalein, ortho-cresol-sulphophthalein, thymol-sulfophthalein, ortho- or meta-cresol phthalein, thymol-phthalein and especially phenolphthalein.

Instead of introducing the radical

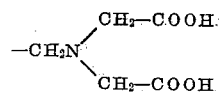

into the finished indicator dyestuff it is also possible to introduce the aforesaid radical into an intermediate product used for making the dyestuff and thereafter completing the synthesis of the dyestuff.

The new derivatives of indicator dyestuffs obtainable in accordance with the invention are distinguished by the fact that they form complex compounds with various metal ions. This formation of complexes may be associated with a change in the color of the indicator dyestuff. The derivatives of the indicator dyestuffs, in which the formation of complexes with metal ions is associated with a change in color of the indicator, can be used for the analytical determination of the metal ions in question. In other words, there is obtained from the acid-base indicator, which is sensitive to hydrogen ions, an indicator which is responsive to metal ions.

The indicator derivatives sensitive to metal ions can be used mainly in two analytical methods, namely, in colorimetric and titrimetric analysis. In colorimetric analysis the strength of the color produced by complex formation is measured. The concentration of metal ions can be determined as a function of extinction.

In order to determine the content of metal ions in a solution of titrimetric analysis the indicator is added to the solution and the metal ion is titrated with an agent capable of forming complexes more strongly with the metal ion, but producing no coloration, until the indicator changes color. In this manner, for example, alkaline earth metal ions such as Ca··, Ba·· and Sr··, can be determined. For the determination of calcium ions, for example a derivative of phenolphthalein which contains between 2 and 4 radicals

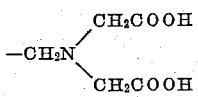

is added to the solution to be tested. The indicator is thereby turned red. The solution is then titrated with an agent capable of forming complexes strongly with calcium ions, for example, nitrilo-triacetic acid or ethylene diamine-tetracetic acid until the indicator has assumed its original color. By means of the aforesaid indicator sulfate ions can also be determined by precipitating the sulfate ions with an excess of barium ions and subsequently back titrating the excess of barium ions with a strong complex-forming agent.

The following examples illustrate the invention, the parts being by weight unless otherwise stated, and the relationship of parts by weight to parts by volume being the same as that of the kilogram to the liter:

*Example 1*

32.0 parts (1 mol) of phenolphthalein are dissolved in a mixture of 100 parts of water and 30 parts by volume of caustic soda solution of 30 per cent. strength. There are then added while stirring 53.2 parts (4 mols) of iminodiacetic acid dissolved in a mixture of 80 parts of water and 68 parts by volume of caustic soda solution of 30 per cent. strength. 41 parts of an aqueous solution of formaldehyde of 37 per cent. strength are then added dropwise, and the reaction mixture is then heated for 8 hours at 60–70° C. After cooling the mixture and diluting it with water, it is acidified with dilute hydrochloric acid, the precipitated condensation product is separated by filtering with suction and recrystallized from alcohol.

*Example 2*

7.0 parts of ortho-cresolphthalein are dissolved in a mixture of 20 parts by volume of alcohol, 10 parts of water and 4 parts by volume of caustic soda solution of 30 per cent. strength. There is then added a solution of 5.8 parts of iminodiacetic acid in 8 parts of water and 7 parts by volume of caustic soda solution of 30 per cent. strength. 4.0 parts of an aqueous formaldehyde solution of 37 per cent. strength are then added dropwise while stirring, and, when the addition is complete the mixture is heated for 2 hours at 60–70° C. At the end of this period a test portion diluted with water no longer becomes turbid on acidification with acetic acid. After cooling the mixture and diluting it with water it is acidified with dilute hydrochloric acid and the condensation product is separated by filtering with suction. It may be purified by treatment in alcoholic solution with blood charcoal. There is obtained a pale pink powder, which dissolves easily in alcohol.

*Example 3*

A solution of 107 parts of iminodiacetic acid dimethyl ester in ethyl acetate is added dropwise, while stirring, to a solution of 62 parts of 4-nitro-2-chloromethyl-phenol in 300 parts by volume of ethyl acetate, while cooling with ice. After a short time crystals of the hydrochloride of iminodiacetic acid dimethyl ester begin to separate. After heating the reaction mixture for 2 hours at 40–50° C., the precipitated salt is filtered off, washed with ethyl acetate, and the filtrate is evaporated to dryness. The 3-nitro-6-hydroxybenzylamino-diacetic acid dimethyl ester is obtained in theoretical yield in the form of yellow crystals. After recrystallization from alcohol it melts at 96.5–97.5° C.

In order to hydrolyze the ester, 9.3 parts thereof are dissolved in 40 parts of alcohol and a total of 18 parts by volume of caustic soda solution of 15 per cent. strength is added in portions to the solution at 40–50° C. After 30 minutes the hydrolysis is finished. Then the reaction mixture is evaporated to dryness at 40–50° C. in vacuo, the residue is dissolved, and the acid is precipitated by acidification with dilute hydrochloric acid. There is obtained 3-nitro-6-hydroxybenzylaminodiacetic acid in the form of a pale yellow powder.

*Example 4*

9.2 parts of the azo dyestuff from diazotized 4-chloro-1-aminobenzene and hydroxybenzene are dissolved in a mixture of 20 parts by volume of ethyl alcohol and 4 parts by volume of sodium hydroxide solution of 30 per cent strength. There is then added while stirring a solution of 6.8 parts of iminodiacetic acid, 10 parts of water and 7.4 parts by volume of sodium hydroxide solution of 30 per cent strength, and then 4 parts of formaldehyde solution of 37 per cent strength. After heating for 3 hours at 60–70° C. a test portion is soluble in dilute acetic acid. After dilution with water acidification with acetic acid, the mixture is filtered to free it from a slight turbidity, and the solution is evaporated to dryness in vacuo. The dyestuff may, alternatively, be precipitated by acidifying the solution with hydrochloric acid, and filtering it off and then drying it.

*Example 5*

26.6 parts of iminodiacetic acid are dissolved in 20 parts of water and 38 parts by volume of sodium hydroxide solution of 30 per cent strength. A solution of 30 parts of 4-acetylamino-1-hydroxybenzene, 20 parts of water and 20 parts by volume of sodium hydroxide solution of 30 per cent strength is added, and then 18 parts of a formaldehyde solution of 37 per cent strength are added while stirring. After stirring for 5 hours at 60–70° C., the reaction mixture is acidified with hydrochloric acid and evaporated to dryness in vacuo. The residue is stirred in the warm with 100 parts of hydrochloric acid of 20 per cent strength, whereby the product is dissolved, but the greater part of the resulting sodium chloride remains undissolved. After filtering off the residue and washing it with hydrochloric acid, the filtrate is boiled under reflux for one hour and then evaporated to dryness in vacuo. The residue obtained in the form of a pale yellow solid product is the dihydrochloride of the compound of the formula

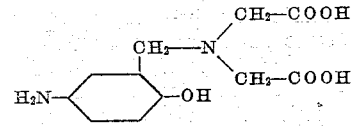

This dihydrochloride is diazotized in the usual manner with sodium nitrite and coupled in an alkaline medium, for example, with phenol or resorcinol.

*Example 6*

DETERMINATION OF BARIUM

The solution, of which the barium content is to be determined, should contain no or only small amounts of ammonium salts. Any acid present is first neutralized with caustic soda solution, but not with ammonia. There are then added, per 100 cc. of the solution, 5 cc. of a molar solution of ammonia and 0.5 cc. of a molar solution of ammonium chloride (a molar solution contains 1 gram-mol of the substance dissolved in 1 liter of the aqueous solution) so that a pH value somewhat above 10 is produced. A few drops of the indicator are introduced (15-20 drops of a solution containing 0.02 gram of the condensation product from 1 mol of phenolphthalein, 4 mols of formaldehyde and 4 mols of iminodiacetic acid and 1 cc. of a molar solution of sodium acetate, per 100 cc. of solution), and titration is carried out with a standard solution of a complex-forming agent (producing no coloration) until a sudden change from violet red to pink occurs. Complete decoloration of the solution cannot be brought about by means of an excess of the solution, because at the chosen pH value the barium-free indicator is also light pink. It is of advantage to use for comparison a solution which has been titrated out. The residual pink coloration can also be compensated for by the addition of a small trace of yellow-green dyestuff, for example, a mixture of malachite green and methyl red. The color change is especially sharp when only a small quantity of barium ions is present.

As the standard solution there may be used a solution of 0.1 mol of the disodium salt to ethylene diaminetetracetic acid per liter of aqueous solution. Somewhat more sharp is the color change when the tetra-alkali salt of diamino-diethyl-glycol ether tetracetic acid of the formula

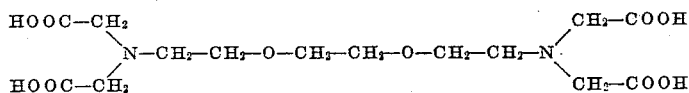

is used as the complex-forming agent in the standard solution.

Strontium can be titrated in the same manner as barium.

*Example 7*

DETERMINATION OF SULFATE

The solution of which the content of sulfate is to be determined is rendered weakly acid, and slightly more than the equivalent quantity of barium chloride is added at the boiling temperature. As soon as the precipitate has become coarsely crystalline, the mixture is cooled, and the suspension is charged into a measuring flask to a determined volume, thoroughly shaken, and after the precipitate has settled an aliquot portion is withdrawn for titrating the excess of barium. The titration is carried out in the manner described in Example 6, with the use of the same indicator and a standard solution of the same complex-forming agent.

Owing to the fact that the barium complex of the phenolphthalein derivative used is so stable that the indicator responds slightly to the concentration of barium suspended in the form of barium sulfate, it is necessary in determining the sulfate ions to remove the barium sulfate before the excess of barium ions is back titrated with a complex-forming agent.

What we claim is:

1. A derivative of an acid-base indicator dyestuff, which contains the radical of the formula

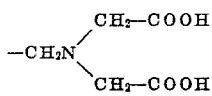

in at least one position vicinal to an auxochromic group selected from the class consisting of unsubstituted amino groups and hydroxyl groups of phenolic character, the amino and hydroxyl groups being bound to a monocyclic carbocyclic aromatic nucleus.

2. A derivative of an acid-base indicator dyestuff, which contains the radical of the formula

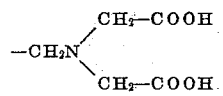

in at least one ortho-position to a hydroxyl-group of phenolic character, and which contains at most three monocyclic carbocyclic aromatic nuclei.

3. A derivative of an acid-base indicator dyestuff of the triphenyl-methane-dyestuff series, which contains the radical of the formula

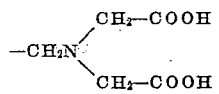

in at least one ortho-position to a hydroxy group of phenolic character.

4. A derivative of an acid-base indicator dyestuff of the phthalein series, which contains the radical of the formula

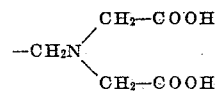

in at least one ortho-position to a hydroxyl group of phenolic character.

5. The derivative of phenolphthalein of the formula

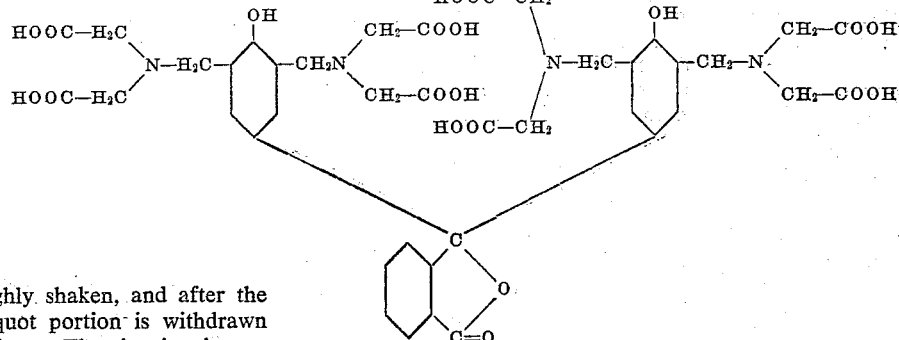

6. The derivative of ortho-cresol phthalein of the formula

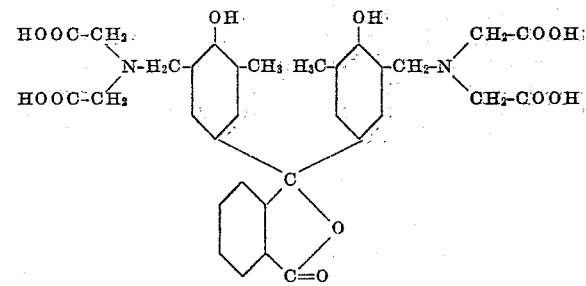

7. In the process of determining metal ions by formation of complexes, wherein said complex formation is made visible by the addition of an indicator which forms a complex with the metal ion to be determined, said complex formation producing a change in color, the modification wherein the indicator which is responsive to complex formation is a derivative of an acid-base indicator dyestuff, which contains the radical of the formula

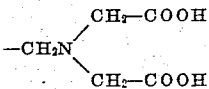

in at least one position vicinal to an auxochromic group selected from the class consisting of unsubstituted amino groups and hydroxyl groups of phenolic character, the amino groups and hydroxyl groups being bound to a monocyclic carbocyclic aromatic nucleus.

8. In the process of determining metal ions by formation of complexes, wherein said complex formation is made visible by the addition of an indicator which forms a complex with the metal ion to be determined, said complex formation producing a change in color, the modification wherein the indicator which is responsive to complex formation is a derivative of an acid-base indicator dyestuff, which contains the radical of the formula

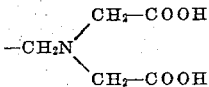

in at least one ortho-position to a hydroxyl group of phenolic character, and which contains at most three monocyclic carbocyclic aromatic nuclei.

9. In the process of determining metal ions by formation of complexes, wherein said complex formation is made visible by the addition of an indicator which forms a complex with the metal ion to be determined, said complex formation producing a change in color, the modification wherein the indicator which is responsive to complex formation is a derivative of an acid-base indicator dyestuff of the triphenyl-methane-dyestuff series, which contains the radical of the formula

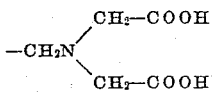

in at least one ortho-position to a hydroxyl group of phenolic character.

10. In the process of determining alkaline earth metal ions by formation of complexes, wherein said complex formation is made visible by the addition of an indicator which forms a complex with the metal ion to be determined, said complex formation producing a change in color, the modification wherein the indicator which is responsive to complex formation is a derivative of an acid-base indicator dyestuff of the phthalein series, which contains the radical of the formula

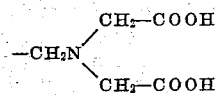

in at least one ortho-position to a hydroxyl group of phenolic character.

11. In the process of determining alkaline earth metal ions by formation of complexes, wherein said complex formation is made visible by the addition of an indicator which forms a complex with the metal ion to be determined, said complex formation producing a change in color, the modification wherein the indicator which is responsive to complex formation is the derivative of phenolphthalein of the formula

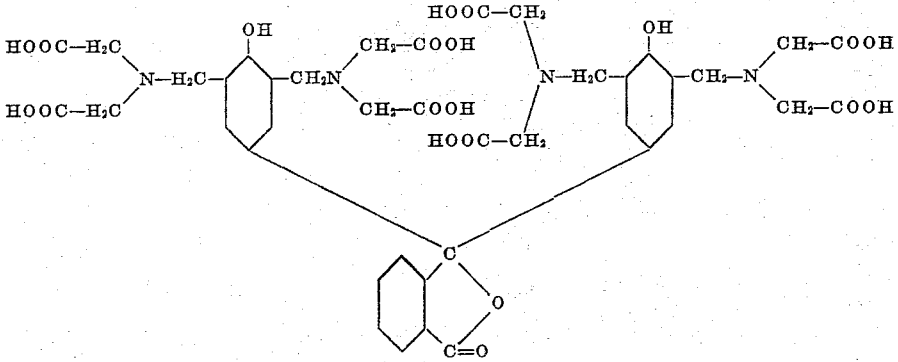

12. In the process of determining alkaline earth metal ions by formation of complexes, wherein said complex formation is made visible by the addition of an indicator which forms a complex with the metal ion to be determined, said complex formation producing a change in color, the modification wherein the indicator which is responsive to complex formation is the derivative of ortho-cresol phthalein of the formula

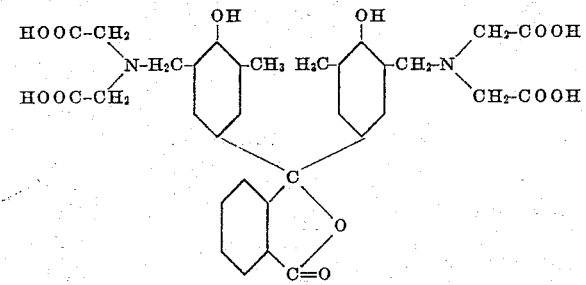

References Cited in the file of this patent

UNITED STATES PATENTS

| Number | Name | Date |
| --- | --- | --- |
| 2,122,409 | Clarke | July 5, 1938 |
| 2,562,198 | McKinney | July 31, 1951 |
| 2,583,891 | Schwarzenbach | Jan. 29, 1952 |
| 2,624,756 | Bersworth | Jan. 6, 1953 |
| 2,624,757 | Bersworth | Jan. 6, 1953 |
| 2,624,758 | Bersworth | Jan. 6, 1953 |
| 2,624,759 | Bersworth | Jan. 6, 1953 |

FOREIGN PATENTS

| 48,570 | France | Jan. 5, 1938 |